Patented Oct. 11, 1949

2,484,756

UNITED STATES PATENT OFFICE 2,484,756

METHOD OF PREPARATION OF COMPOSITION FABRIC MATERIAL

Howard Snow and Julia D. Hill, Charlotte, N. C., assignors to Southern Friction Materials Company, a corporation of North Carolina No Drawing. Application June 29, 1945, Serial No. 602,426

4 Claims. (Cl. 117—64)

This invention relates to impregnated fabric materials of the type adapted for composition shoe soling, floor coverings, step treads, friction surfaces, and other related uses.

This is continuation-in-part of the copending applications Ser. No. 467,620, filed December 2, 1942, now Patent No. 2,424,861, and Ser. No. 490,877, filed June 15, 1943, refiled after allowance as application Serial No. 699,641, filed September 27, 1946, which was allowed April 20, 1949.

We have discovered that an impregated flexible fabric material having many desirable properties may be obtained by impregnating fabric material with a thermosetting resin composition and applying heat to the impregated material to remove solvent and harden and set (i. e. cure) the impregnant in situ; pressure-abrading the impregnated material to remove the hard and brittle surface crust of impregnant which forms during the curing step, and thus render the fabric material softer, smooth, gripping, and flexible; and then finishing the impregnated and pressure-abraded fabric material to augment the physical properties of the resulting composition fabric material.

An important feature of our invention is that smooth, gripping, attractive, composition fabric materials can be prepared in the manner just described from coarse, cheap cotton and even jute fabrics. Impregnated fabric materials prepared in this manner are smooth and flexible and have excellent wear and water resistance, and possess an appearance and texture which is unique in materials of this type.

The method of preparing the impregnated fabric materials of our invention as noted above, comprises three distinct stages of treatment: (1) impregnation, in which the fabric material is filled or bodied and conditioned for wear and water resistance and the like; (2) pressure-abrading, in which the hard and brittle impregnant crust formed during curing is removed to render the impregnated fabric material flexible and to divest it of undesirable surface characteristics; and (3) finishing, in which the impregnated and pressure-abraded fabric material is treated to supplement and enhance the physical properties and appearance of the impregnated and pressure-abraded fabric material. For certain applications, such as for shoe soling friction surfaces, the composition fabric material of our invention may be used after the first two stages of treatment.

The impregnation is carried out, as previously mentioned, with a thermosetting resin composition. While a substantial variety of materials are available for this purpose, the particular material selected must conform to certain critical limitations. In the first place, the material must be a true impregnant; that is, it must penetrate readily to fill up and body the fabric material. This requirement eliminates such materials as synthetic rubber, latex, cellulose coatings, vinyl chlorides, and so forth, which are adapted primarily for use as coatings and will not penetrate adequately for satisfactory use as impregnants.

Secondly, the particular impregnant selected must be of a character to stand up during the subsequent pressure-abrading operation. As described more in detail below, the pressure-abrading operation results in the generation of considerable heat, and the impregnant will smear and foul the abrading means if it is not adapted for treatment in this manner. The impregnant used should accordingly form a non-sticky surface crust upon curing which will not become tacky during the pressure-abrasion. Thermoplastic resin compositions or impregnants having an asphalt or coal tar base, for instance, are not suited for use according to our invention because they cannot be pressure-abraded satisfactorily.

In addition to the foregoing requirements, the particular impregnant selected must also be capable of providing the ultimate physical properties desired in the finished fabric material, such as flexibility, and wear and water resistance.

A specific example of a commercially advantageous impregnating composition particularly suited for use in preparing the impregnated fabric material of our invention comprises a relatively hard phenolic resin, petroleum polymers, and a drying oil. Representative percentage compositions of an impregnant of this type are as follows:

|  | Per Cent by Weight | | |
| --- | --- | --- | --- |
|  | A | B | C |
| Phenolic resin | 20 | 17 | 15 |
| Petroleum pitch | 25 | 33 | 40 |
| Drying oil | 55 | 50 | 45 |
|  | 100 | 100 | 100 |
| Organic solvent | 75 | 75 | 75 |
| Driers | As indicated. | | |

Fabric material impregnated with Composition A above is characterized by high flexibility. Fabric material impregnated with Composition C has greater body, and wear and water resistance, at the expense, somewhat, of flexibility. Composition B results in an impregnated fabric in which the properties of flexibility and body are intermediately balanced.

The hard resin component of the above compositions provides the desired toughness and wear resistance that characterizes the impregnated fabric material of our invention. Besides the phenolic resins indicated above other suitable materials for use as the resin component are: modified phenolic resins, such as "Amberol" resin and "Phenac 622N"; resinates such as "Zirex" which is a zinc resinate; neutralized rosin; ester gum; and fused Congo gum.

The petroleum polymer component, sometimes referred to as petroluem pitch, functions as a plasticizer and impregnation accelerator or introfier in the above compositions. This component also improves the impregnant-to-fabric bond and augments the oleaginous property of the treated material. A notable difficulty in impregnating fabric materials, particularly cotton fabrics, is the problem of obtaining adequate penetration and adherence of the impregnant in the fabric structure. Resins and oils will not accomplish this result satisfactorily alone. Asphalt tends to act as a penetrating supplement, but as mentioned above it cannot be employed in effective quantities according to our invention because it will not stand up under pressure-abrasion after curing. The introfying characteristics of petroleum polymers are unique for application according to the present invention.

Petroleum polymers, as they are known to the trade, are composed of polymerized olefinic hydrocarbons of petroleum origin. A specific example is Pur-O-Resin, (No. 2138) which is manufactured by the Pure Oil Co. and has the following published characteristics; Per cent solids, 85% minimum; viscosity 275-325 at 210° F.; iodine value 200 minimum, saponification value less than one; reactive with drying oils; boiling range begins at about 450° F. The term "petroleum polymers" is used in this application to include the above described material and other materials of similar nature and characteristics.

To provide the desired flexibility and tensile strength in the treated material and to modify somewhat the hardening properties of the resin component, a drying oil is included in the above compositions in a major proportion. Illustrative examples are: linseed oil; China-wood oil; oiticica oil; perilla oil; soybean oil; dehydrated castor oil; and, cashew-nut shell oil. The various commonly available synthetic drying oils may also be used such as: "Highland G" oil, which is a derivative of native linseed oil with the break removed, and is manufactured by the Highland Chemical Company, New York, N. Y.; and "Hyodol Glycerides" which is manufactured by the Werner G. Smith Co., Cleveland, Ohio, and is prepared by splitting the glycerin from fish oil, such as sardine oil, followed by fractionating the fish oil acids and finally re-esterifying the fraction consisting partially of culpanodonic acids to obtain a product which is the glyceride of culpanodonic acid and similar highly unsaturated fatty acids.

The impregnating composition is thinned with a suitable organic solvent to obtain the desired fluidity for impregnation. Various commercial solvents, such as xylol and benzol, may be used for this purpose. Also any of the materials known in the trade as petroleum thinners such as "Varsol," "Solvesso," and V. M. & P. Solvent which are manufactured by the Standard Oil Company of New Jersey, and "Amsco Spirits" manufactured by the American Mineral Spirits Company, may be used. All of these trade-mark products are well-known, light petroleum distillates and are widely available in commercial quantities.

Any of the usual driers such as lead or manganese naphthenate may be used with the above compositions as indicated to facilitate the curing process.

The impregnation treatment is carried out by suitably mixing the resin, petroleum polymer, and drying oil components of the impregnating composition in the proportions desired as indicated above, and heating the components together until they react and combine with each other and until the resulting solution has reached the proper viscosity. The solvent and any indicated driers are then added and thoroughly mixed with the above heat reaction product of resin, petroleum pitch and drying oil to form the complete composition.

The impregnation is carried out with either a single dip or multiple dip procedure. Usually it is desirable to employ more than one dip because there is a practical limit from the standpoint of viscosity to the amount of impregnant that can be taken up by the fabric material in any one dip, and as an impregnant solids concentration of the order of 40% should be obtained in most cases to condition the treated fabric material with proper physical properties, a multiple dip process is normally indicated. The percentage compositions indicated above are adapted for two-dip treatments. If otherwise desirable, however, it is possible to increase the impregnant solids concentration of the treated fabric material obtained in a one dip process by using an impregnating composition of high solids content and by carrying out the impregnation at higher temperatures to cut the viscosity.

In conducting the impregnation treatment the fabric material is dipped or immersed in the impregnating composition maintained at a temperature of about 110° F. After dipping, the impregnated fabric material is placed in a drying chamber and dried for about one and one-half to two hours at about 275° F.

After drying the initially impregnated fabric material is dipped a second time and then allowed to air dry. The impregnated fabric material is then cured at a temperature of the order of 200° F. to 275° F. for about 24 to 36 hours.

The impregnation treatment is followed, as previously noted, with a pressure-abrading operation to remove the crust of hardened impregnant formed during the curing process so as to render the impregnated fabric material flexible and condition its surfaces. The impregnated fabric materials are hard and stiff after curing by virtue of the impregnant crust formed during this step. Moreover, this curing crust follows the surface irregularities of the original fabric material and presents a very undesirable surface. Pressure-abrasion is necessary to remove this curing crust properly. Other types of abrasion, such as a wire brush and sand blast, will not give satisfactory results.

Also, as described more in detail below, it is necessary to lubricate the pressure-abrasion operation, as with water, to obtain the maximum benefit from this treatment. Wet pressure-abrasion is peculiarly adapted for the high pressure/abrasion ratios which result in the unique surface characteristics of the composition fabric material of the present invention. Dry pressure-abrasion at comparable pressure/abrasion ratios produces severe surface napping which impairs the physical properties of the treated material and precludes satisfactory finishing treatment.

The pressure-abrasion may be carried out on a conventional endless bed dimensional sander. A sander arranged for fixed roll clearance rather than fixed pressure is preferred. Reference is made to the copending application of Snow and Pickard, Ser. No. 530,648, filed April 12, 1944, now Patent No. 2,402,689, for a disclosure of pressure-abrading apparatus of this type adapted for use in the present instance. Generally described, a dimensional sander comprises a plurality of abrading rolls (suitably, in this instance, three) arranged above a bed on which a flat surfaced support or carriage is mounted to be moved under the rolls. Material to be pressure-abraded is laid on the movable carriage and passed under the rolls. The abrading rolls are vertically adjustable to vary the clearance dimension between the rolls and the movable carriage. Water is sprayed on the rolls during operation to lubricate the abrasion and keep the rolls clean.

In carrying out the pressure-abrading operation, the impregnated and cured fabric material is heated for about 15 minutes at about 250° F. and then placed in a heated water bath, such as a container with water continuously heated by live steam. The treated fabric material is allowed to remain in this hot water bath for a short period to effect softening and wetting of the material. Usually a period of several minutes is sufficient for this purpose. This preliminary heat treatment conditions the impregnated fabric material so that it may be pressure-abraded more easily.

The wet and softened impregnated fabric material is then pressure-abraded to remove the impregnant curing crust. This operation may be carried out by either batch or continuous procedures as described in the above mentioned copending application, Ser. No. 530,648. An important feature of this operation is the water-lubricated pressure applied as a result of the fixed clearance maintained while the abrading is effected. This pressure results from the fact that the abrading rolls are necessarily adjusted to less than the thickness dimension of the impregnated fabric material in order to remove the hardened impregnant crust, so that considerable pressure is applied to the treated fabric material as it is passed under the abrading rolls and the water-lubrication allows a high pressure/abrasion ratio to be used. This pressure produces a supplemental calendering effect during the abrading operation which substantially improves the smoothness and uniformity of the abraded surfaces.

As previously mentioned, the impregnant tends to harden and set in conformity with the surface irregularities of the original fabric material. In view of this circumstance, it is highly advantageous to produce a "flow" at the surface of the impregnated fabric material to fill up the depressions occasioned by these irregularities as well as level off the high spots. Pressure-abrasion, particularly when the fabric material is preheated as described above, accomplishes this result in a very satisfactory manner; and, as a general proposition, the greater the pressure applied, the better are the results obtained.

Care must be taken in this connection, however, that napping of high spots does not occur as the pressure is increased. The above described preliminary heat and water treatment, as well as the water spray played on the abrading rolls, has an important effect in obviating this result by lubricating the pressure-abrading operation. This lubricating effect may be augmented by including a waxy emulsion in the water bath. An illustrative example is the use of a dispersible wax in the water bath in combination with an aluminum acetate water repellant material, such as the product known commercially as "Paratex" which is sold by the Charlotte Chemical Laboratories, Inc., Charlotte, N. C. Also, as described more in detail below, the impregnation treatment may be modified to include the use of materials to facilitate the pressure-abrading operations.

The pressure-abrasion method described above removes the impregnant curing crust quickly and without damaging the fabric material, and produces smooth, filled surfaces which are uniform and even. In most cases it will be advantageous to pressure-abrade the impregnated fabric material on both sides, although it may only be necessary to abrade one side in particular instances.

When fabrics having a high degree of pebble, such as jute fabrics or naught ducks, are employed according to our invention, the surface irregularities of the impregnated and cured fabrics are pronounced and require treatment by pressure abrasion to a correspondingly greater extent. Under these circumstances, we have found that the process of our invention is facilitated by including a pigment supplement in the impregnation treatment. The pigment may be selected to match the color of the fabric being treated, for example, white diatomaceous silica may be used in treating cotton duck, or colored pigments may be used if colored effects are desired.

It appears that when pigment is used in this manner, the pigment is disposed by a filtering effect during impregnation so that it tends to fill up the surface depressions of the impregnated fabric occasioned by the pebble of the fabric being treated, and thus makes it possible to obtain a desirable surface after impregnation and curing with less severe pressure-abrasion. Also, the pigment has the effect of excluding air from the body of the fabric material during curing so that the darkened curing crust is substantially restricted to the surfaces of the treated fabric material and may be easily removed. The use of pigment has the further advantage that it allows soapy water to be used to lubricate the pressure-abrasion operation. Soapy water effects a decided improvement in the lubrication obtained during pressure-abrasion, but it normally has the undesirable effect of washing the treated fabric pores clean so that the pebble is accentuated. The incorporation of pigment obviates this effect and results in a well filled and attractive surface after pressure-abrasion.

The impregnation treatment is modified to include a pigment supplement by incorporating ground pigment in the ratio of about one part of pigment by weight to two parts of impregnant solids in the impregnating composition. Usually effective results can be obtained by using pigment only in the second dip treatment.

The impregnated and pressure-abraded fabric material prepared as described above is next subjected to a finishing treatment. This finishing treatment takes advantage of the exceptional surfacing effects produced by the pressure-abrading operation to obtain a finished material of unique appearance and texture.

Also, the finishing treatment enhances the physical properties of the composition fabric material obtained. The impregnated and pressure-abraded fabric material, for example, appears to have an affinity for extraneous materials, such as dirt, metal filings, and oil and grease, and exhibits a tendency to pick up such foreign matter. This tendency to pick up foreign matter is entirely eliminated by the finishing treatment.

The finishing treatment may take the form of a sizing treatment, a coating treatment, or a combined sizing and a coating treatment. If a sizing treatment is to be employed, such materials as shellac, casein, zein, phenolic and urea resins, and so forth may be used as the size. The sizing material may be used with or without a suitable plasticizer depending upon whether a rigid or flexible sizing is desired. We have obtained very satisfactory results with plasticized urea-formaldehyde resin (either water or solvent soluble type) for flexible sizings, and water soluble phenolic resin for rigid sizings.

The sizing operation is carried out by dipping the impregnated and pressure-abraded fabric material in the sizing composition and then running it through squeeze rollers, after which the material is dried at a temperature of about 200° F. for about four to eight hours. The surfaces of the sized fabric material are entirely sealed by the sizing operation, and the sizing results in increased mechanical strength and substantially improved wear resistance.

The sizing treatment may also be adapted to provide a coating effect if desired. For this purpose the sizing composition is adjusted to a relatively high solids concentration, such as 50% or more (or several applications at 30–35% solids concentration are used) and is applied to one or both sides of the impregnated and pressure-abraded fabric material by any regular coating method such as a brush or knife, a metered roll coater, or a spray gun. The fabric material is then baked or dried as above for three or four hours.

It is usually more satisfactory to employ separate sizing and coating treatments. Normally it is only necessary to provide a coated appearance on one side of the material, and it is accordingly more practical in most instances to employ a dip sizing followed by a separate coating application. Also, the surface of impregnated and pressure-abraded fabric materials after dip sizing is ideally suited for coating so that very satisfactory coated appearances are obtained in this manner economically, and the reverse side of the material is better conditioned and more attractive as a result of a dip sizing operation when only one side of the material is to be provided with a coated appearance.

Suitable materials for use in the coating treatment are the various cellulose coating compositions, such as ethyl-cellulose, plasticized zein, and other lacquers. The coating may be applied by the usual coating procedures with a brush or knife or other coating applicator, after which it may be baked or otherwise dried according to the methods commonly used in the coating art.

We claim:

1. The method of preparing a composition fabric material which comprises impregnating a woven, organic fibrous fabric with a thermosetting resin composition, comprising by weight, about 15–20% of an oil-soluble phenol-aldehyde resin, 25–40% of a petroleum pitch composed of polymerized olefinic hydrocarbons and having a minimum iodine number of about 200 and a boiling range beginning at about 450° F., and 45–55% of drying oil, heating the fabric to cure the resin composition in situ, then wetting the impregnated fabric with water and pressure-abrading the surfaces of said fabric while wet to remove the surface crust of impregnant formed during curing whereby the impregnated fabric is divested of undesirable surface characteristics and rendered relatively flexible.

2. The method of preparing a composition fabric material which comprises bodying a woven organic fibrous fabric by impregnation with a thermosetting resin composition, comprising by weight, about 15–20% of an oil-soluble phenol-aldehyde resin, 25–40% of a petroleum pitch composed of polymerized olefinic hydrocarbons and having a minimum iodine number of about 200 and a boiling range beginning at about 450° F., and 45–55% of a drying oil, heating the fabric to cure the resin composition in situ, and then wetting the impregnated fabric with water and pressure abrading the surfaces of said fabric while wet at a high pressure/abrasion ratio to remove the surface crust of impregnant formed during curing to render the fabric relatively flexible and divest it of undesirable surface characteristics and then treating the impregnated and pressure-abraded fabric with a surface finishing composition to seal the surfaces of said fabric.

3. The method of preparing a composition fabric material which comprises impregnating a woven, organic fibrous fabric with a thermosetting resin composition, comprising by weight, about 15–20% of an oil-soluble phenol-aldehyde resin, 25–40% of a petroleum pitch composed of polymerized olefinic hydrocarbons and having a minimum iodine number of about 200 and a boiling range beginning at about 450° F., and 45–55% of drying oil, heating the fabric to cure the resin composition in situ, pressure-abrading the surfaces of the cured fabric while wetting said surfaces with water to remove the surface crust of the impregnant formed during curing whereby the impregnated fabric is divested of undesirable surface characteristics and rendered relatively flexible, and then sizing the impregnated and pressure-abraded fabric to seal the surfaces thereof.

4. The method of preparing a composition fabric material which comprises impregnating a woven, organic fibrous fabric with a thermosetting resin composition, comprising by weight, about 15–20% of an oil-soluble phenol-aldehyde resin, 25–40% of a petroleum pitch composed of polymerized olefinic hydrocarbons and having a minimum iodine number of about 200 and a boiling range beginning at about 450° F., and 45–55% of drying oil, heating the fabric to cure the resin composition in situ, pressure-abrading the surfaces of the cured fabric while wetting said surfaces with water to remove the surface crust of the impregnant formed during curing whereby the impregnated fabric is divested of undesirable surface characteristics and rendered relatively flexible, sizing the impregnated and pressure-abraded fabric to seal the surfaces thereof, and applying a coating to at least one of the surfaces to augment the appearance characteristics of the composition fabric material.

HOWARD SNOW.
JULIA D. HILL.

REFERENCES CITED

The following references are of record in the file of this patent:

UNITED STATES PATENTS

| Number | Name | Date |
|---|---|---|
| 1,728,172 | Bendix | Sept. 17, 1929 |
| 1,766,932 | Novak | June 24, 1930 |
| 1,927,985 | Leahey | Sept. 26, 1933 |
| 2,138,876 | Novak | Dec. 6, 1938 |

OTHER REFERENCES

Simonds et al., Handbook of Plastics, D. Van Nostrand, New York, 1943, pp. 217–218.